United States Patent [19]
Klein

[11] 3,768,828
[45] Oct. 30, 1973

[54] AUXILIARY SHOCK ABSORBER MOUNTING BRACKET

[76] Inventor: Victor A. Klein, Box 55, Hugoton, Kans. 67951

[22] Filed: Jan. 24, 1972

[21] Appl. No.: 220,050

[52] U.S. Cl. .......... 280/124 R, 267/15 R, 267/20 R
[51] Int. Cl. ............................................. B60g 3/02
[58] Field of Search .................... 280/124 R, 124 A; 267/15 R, 15 A, 20 R, 20 A, 20 C

[56] References Cited
UNITED STATES PATENTS

| | | | |
|---|---|---|---|
| 3,193,303 | 7/1965 | Allison et al. | 267/20 R |
| 2,819,769 | 1/1958 | Moorehead | 280/124 R |
| 3,469,859 | 9/1969 | Giacosa | 280/124 R |

*Primary Examiner*—Philip Goodman
*Assistant Examiner*—John A. Carroll
*Attorney*—Harvey B. Jacobson

[57] ABSTRACT

A combined U bolt clamp and U-shaped mounting bracket for attachment to the vertically shiftable axle end of a vehicle and comprising a lower mounting point on the axle end for the lower end of an upstanding airplane-type hydraulic shock absorber whose upper end is anchored relative to a frame portion elevated above the upper limit of movement of the axle end.

4 Claims, 4 Drawing Figures

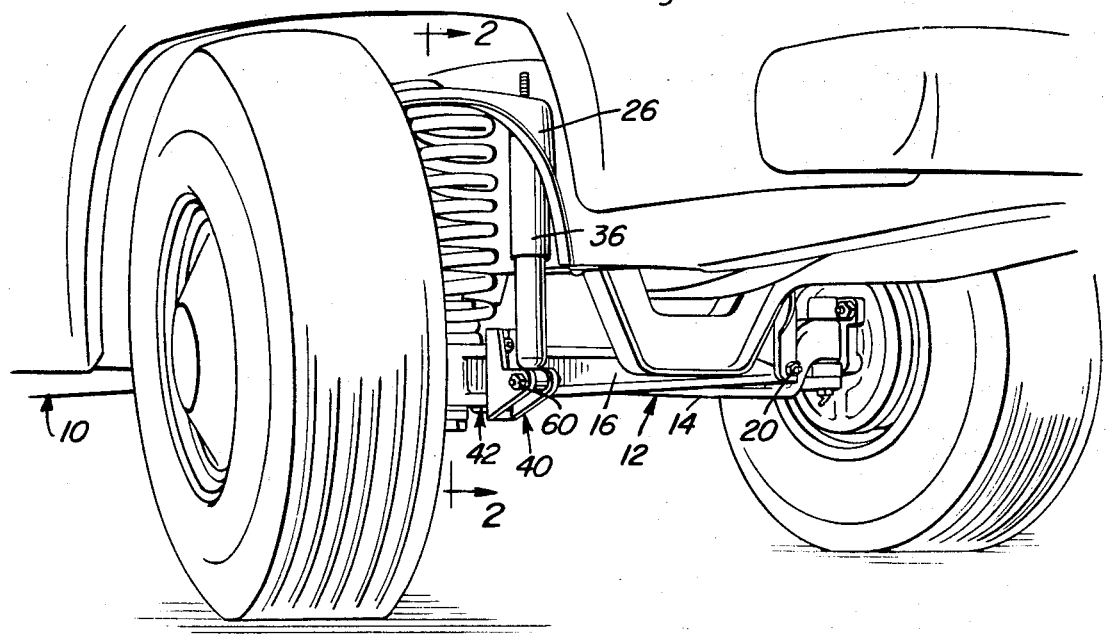
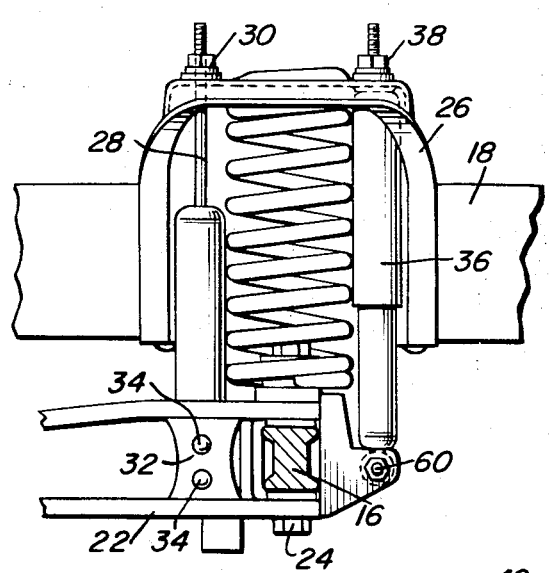
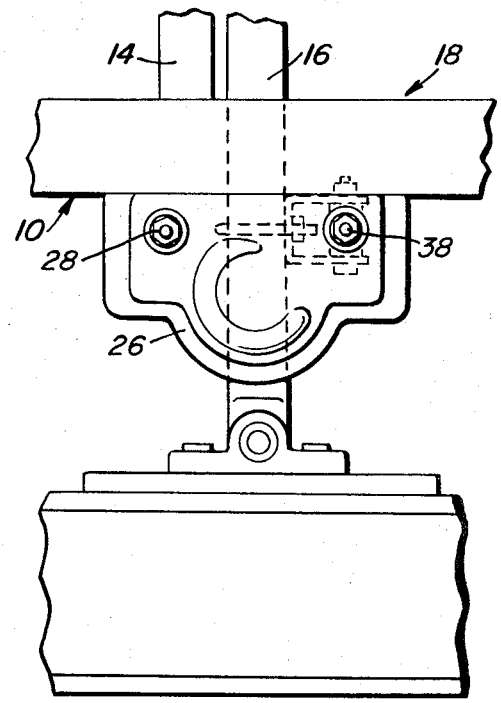
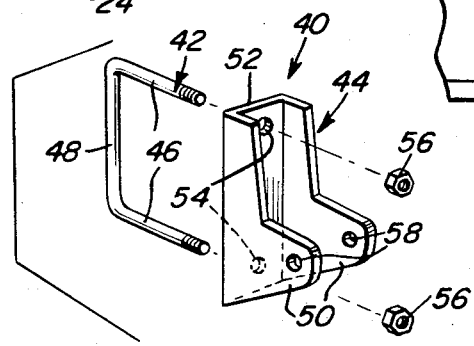

AUXILIARY SHOCK ABSORBER MOUNTING BRACKET

The auxiliary shock absorber mounting bracket of the instant invention has been primarily designed for use on Ford Motor Company vehicles of the type provided with "Twin I-Beam Axles." While the "Twin I-Beam" axle suspension currently utilized by Ford Motor Company on several of their light and medium duty trucks and vans offer independent front wheel suspension while maintaining the ruggedness of a solid transverse axle utilizing kingpins for wheel spindle supports in lieu of the less durable ball joints utilized on most passenger vehicles, off highway driving can occasionally cause even the "Twin I-Beam" suspension to incur misalignment and other maintenance problems. Although normal driving does not cause accelerated fatigue or maintenance problems with "Twin I-Beam" suspension systems, when light and medium duty vehicles are loaded and moved over rough ground the conventional "soft" springing and medium duty shock absorbers provided are overstressed with the result that even the "Twin I-Beam" suspension will "bottom" and weave and darting of the vehicle may be experienced. Also, excessive shock loads encountered while the suspension system is "bottomed" can cause the "Twin I-Beam" axles to bend and continuing bottoming of the suspension system can weaken the associated coil springs. This type of overstressing a front suspension system will of course result in misalignment, erratic steering and abnormal wear on existing shock absorbers as well as tires.

It is accordingly the main object of this invention to provide an auxiliary shock absorber system for the "Twin I-Beam" axle suspension system presently in use. By the addition of additional shock absorbers heavier loads may be carried over rough terrain without the suspension system bottoming and if it is desired, the load carrying capacity of the front end of the vehicle may also be increased by the utilization of the type of shock absorbers equipped with their own coil springs.

Another object of this invention is to provide an auxiliary shock absorber mounting bracket including structural features enabling the bracket to be operatively mounted on the associated axle beam merely through the utilization of a U bolt and with no alterations to the axle beam being required.

A still further object of this invention is to provide a mounting bracket in accordance with the immediately preceding object and which will provide a lower point of attachment for an upstanding airplane-type shock absorber with the established lower shock absorber mounting point spaced substantially vertically below an existing bore formed in the spring tower of the associated vehicle and through which the upper end shank portion of the associated shock absorber may be secured.

A final object of this invention to be specifically enumerated herein is to provide an auxiliary shock absorber mounting bracket in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a fragmentary perspective view of the forward right-hand corner portion of the front suspension assembly produced by Ford Motor Company and known as "Twin I-Beam" suspension, the auxiliary shock absorber mounting bracket of the instant invention being illustrated in mounted position together with the associated auxiliary shock absorber;

FIG. 2 is an enlarged fragmentary longitudinal vertical sectional view taken substantially on the plane indicated by the section line 2—2 of FIG. 1;

FIG. 3 is a top plan view of the assemblage illustrated in FIG. 2; and

FIG. 4 is a perspective view of the shock absorber mounting bracket of the instant invention.

Referring now more specifically to the drawings, the numeral 10 generally designates a truck-type vehicle including a "Twin I-Beam" suspension assembly referred to in general by the reference numeral 12. The assembly 12 includes a pair of transverse I-Beams 14 and 16 reversed in end to end relation and extending transversely of the forward end of the vehicle 10. Remote ends of the beams 14 and 16 are each pivotally secured to the frame 18 of the vehicle 10 by means of fasteners 20 for oscillation about horizontal axes extending longitudinally of the vehicle 10 and the opposite ends of the I-Beams 14 and 16 are located by means of radius arms 22 extending longitudinally of the vehicle 10, having their rear ends universally supported from the frame 12 and their forward ends secured to the axle members 14 and 16. The forward end of each radius arm 22 is bifurcated and the corresponding axle end is secured between the furcations of the associated radius arm by means of a fastener 24.

The frame 18 includes a pair of forward opposite side spring towers 26 and the upper end of each original equipment shock absorber 28 is secured through an appropriate opening provided therefor in the associated spring tower 26 by means of a suitable fastener 30. In addition, the forward end of each radius arm 22 includes a web 32 to which a lower shock absorber mounting bracket (not shown) is secured by means of fasteners 34 and the lower ends of the shock absorbers 28 are secured to these mounting brackets by conventional means (not shown).

It will be noted that the conventional or original equipment shock absorbers 28 are disposed to the rear of the corresponding axle beams 14 and 16. However, it is pointed out that the forward portions of the spring towers 26 are conventionally provided with forward openings corresponding to those through which the upper ends of the original equipment shock absorbers 28 are secured. Accordingly, the upper ends of supplemental shock absorbers 36 are secured through these additional forward openings by means of fasteners 38 and the lower ends of the supplemental shock absorbers are secured to the forward sides of the corresponding axle beams 14 and 16 by means of the mounting brackets of the instant invention which are referred to in general by the reference numeral 40.

From FIG. 4 of the drawings, it may be seen that each mounting bracket 40 includes a U bolt 42 and a U-shaped bracket 44. Each U bolt 42 includes upper and lower legs 46 which extend longitudinally of the vehicle 10 and are horizontally disposed. The rear ends of the legs 46 are interconnected by means of an integral vertically extending bight portion 48 and the U bolt 42 is embracingly engaged with the corresponding axle beam in the manner illustrated in FIGS. 2 and 3 of the drawings with U bolt 42 embracing the rear side of the corresponding beam and the free ends of the legs of each U bolt projecting forwardly of the corresponding axle beam. Each bracket 44 includes a pair of upstanding flanges 50 extending in fore and aft direction and interconnected at their rear ends by means of an upstanding bight portion 52 extending therebetween. The bight portion 52 has vertically spaced apertures 54 formed therethrough and the free ends of the legs 46 are received through the apertures 54 and are secured therethrough by means of suitable fasteners 56. In this manner, each of the brackets 40 is clamped to the corresponding axle beam end. Also, it will be noted that the flanges 50 include forward extensions having horizontal aligned apertures 58 formed therethrough and the lower end of each supplemental shock absorber 36 is secured to the corresponding bracket 44 by means of a fastener 60 secured through the apertures 58.

From the foregoing it may therefore be seen that the pair of supplemental shock absorbers 36 may be secured to the axle beams 14 and 16 merely by the attachment of the mounting brackets 40 to the corresponding beam ends. Thereafter, it is merely necessary to secure the upper portions of the shock absorbers 36 to the spring towers 26 by the fasteners 38 and the lower ends of the shock absorbers 36 to the brackets 44 by means of the fasteners 60. Thus, no modifications of the suspension system are required and no modifications to the frame of the vehicle are required. Still further, the shock absorbers 28 and 36 associated with each axle beam are disposed on the rear and the front sides, respectively, of the beam and from FIG. 3 of the drawings it will be noted that each pair of corresponding shock absorbers 28 and 36 are aligned longitudinally of the vehicle 10. Also, the conventional shock absorbers 28 are connected to the radius arms 22 while the supplemental shock absorbers 36 are anchored relative to the beam ends.

By providing the suspension system 12 with two shock absorbers at each wheel location, heavier loads may be carried over uneven terrain without the suspension system 12 bottoming. However, normal operation of the suspension system 12 over smooth roads is altered only slightly by the addition of the supplemental shock absorbers 36 thereto.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with an elongated vehicle frame having front and rear ends and including a downwardly opening spring tower at one side of said frame and provided with an outboard portion forming a downwardly opening coil spring seat and inboard portions spaced forward and rearward of said seat defining shock absorber anchor locations, a transverse axle supported from said frame for vertical shifting of one end of said axle beneath said seat, the other end of said axle being pivotally supported from the other side of said frame for oscillation about a horizontal axis extending longitudinally of said frame, a radius arm extending longitudinally of said frame and oscillatably supported at one end from the frame for vertical swinging of its other end and secured, at its other end, to said one axle end, thereby establishing means to locate said one axle end longitudinally of said frame, a first upstanding airplane-type hydraulic shock absorber connected between one anchor location and said one axle end on one side of said transverse axle, a second upstanding airplane-type shock absorber connected between the other anchor location and said other end of said radius arm on the other side of said one axle end, said first and second shock absorbers being aligned longitudinally of said frame.

2. The combination of claim 1 including an upstanding horizontally opening U bolt embracingly engaged with one side of said axle end, a generally U-shaped mounting bracket including a pair of parallel edge upstanding and horizontally extending flanges interconnected at one pair of ends by means of an integral bight portion extending therebetween, said bight portion having a pair of apertures formed therein, said mounting bracket being abutted against the other side of said axle end with the free ends of said U bolt secured through said apertures, fastener means securing the free ends of said U bolt through said apertures, the lower end of said first shock absorber being pivotally secured between said flanges.

3. The combination of claim 2 wherein the free ends of said U bolt are threaded, and a pair of threaded nuts threadedly engageable with said threaded ends of said U bolt.

4. The combination of claim 2 wherein said bight portion is elongated and said apertures formed therein are spaced longitudinally of said bight portion.

* * * * *